(12) United States Patent
Kwon et al.

(10) Patent No.: US 11,691,407 B2
(45) Date of Patent: Jul. 4, 2023

(54) DISPLAY MODULE MANUFACTURING APPARATUS AND DISPLAY MODULE MANUFACTURING METHOD

(71) Applicants: SAMSUNG DISPLAY CO., LTD., Yongin-si (KR); JASTECH, LTD., Incheon (KR)

(72) Inventors: Ohjune Kwon, Hwaseong-si (KR); Juchan Kang, Cheonan-si (KR); Dongun Jin, Yongin-si (KR); Yumhyun Hwang, Cheonan-si (KR)

(73) Assignees: SAMSUNG DISPLAY CO., LTD., Yongin-si (KR); JASTECH, LTD., Incheon (KR)

( * ) Notice: Subject to any disclaimer, the term of this patent is extended or adjusted under 35 U.S.C. 154(b) by 32 days.

(21) Appl. No.: 17/093,940

(22) Filed: Nov. 10, 2020

(65) Prior Publication Data
US 2021/0245488 A1 Aug. 12, 2021

(30) Foreign Application Priority Data
Feb. 6, 2020 (KR) .......................... 10-2020-0014492

(51) Int. Cl.
*B32B 38/00* (2006.01)
*B32B 37/10* (2006.01)
*G06F 1/16* (2006.01)
*G02B 1/14* (2015.01)

(52) U.S. Cl.
CPC ........ *B32B 38/004* (2013.01); *B32B 37/1018* (2013.01); *B32B 2457/20* (2013.01); *G02B 1/14* (2015.01); *G06F 1/1607* (2013.01); *G06F 1/1652* (2013.01)

(58) Field of Classification Search
None
See application file for complete search history.

(56) References Cited

U.S. PATENT DOCUMENTS

| | | | | |
|---|---|---|---|---|
| 2001/0042923 A1* | 11/2001 | Yanagida | ................ | H01L 24/13 257/779 |
| 2004/0217470 A1* | 11/2004 | Takano | ................... | H01L 24/29 257/734 |
| 2005/0098610 A1* | 5/2005 | Onobori | ............... | B23K 1/0016 228/180.21 |
| 2011/0175237 A1* | 7/2011 | Tomura | ................. | H01L 21/563 257/778 |
| 2014/0240985 A1 | 8/2014 | Kim et al. | | |
| 2019/0372051 A1 | 12/2019 | Kwon et al. | | |

FOREIGN PATENT DOCUMENTS

WO WO 2021117996 6/2021

* cited by examiner

*Primary Examiner* — Christopher T Schatz
(74) *Attorney, Agent, or Firm* — F. Chau & Associates, LLC

(57) ABSTRACT

A display module manufacturing apparatus includes a stage on which a display module is disposed, a heater disposed on the stage, and configured to heat a first area of the display module, and wherein the heater includes a plurality of side surfaces and a contact surface, and a first bump controller detachably coupled to one side surface among the plurality of side surfaces and including a first bottom surface facing an upper surface of the stage. The contact surface is closer to the upper surface of the stage than the first bottom surface.

15 Claims, 16 Drawing Sheets

FIG. 6A
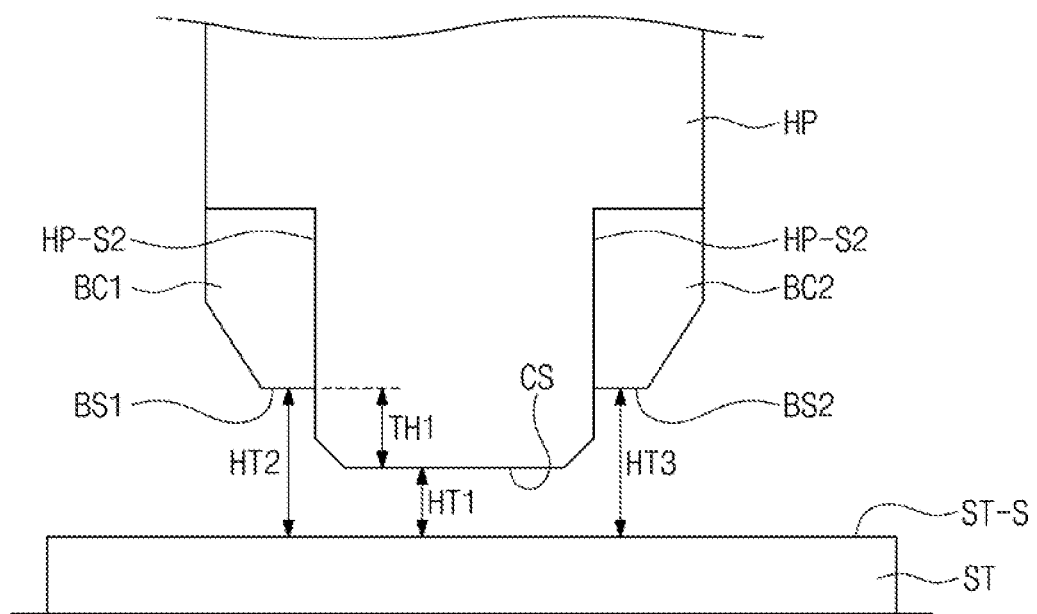
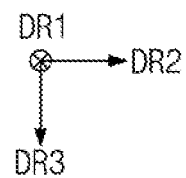

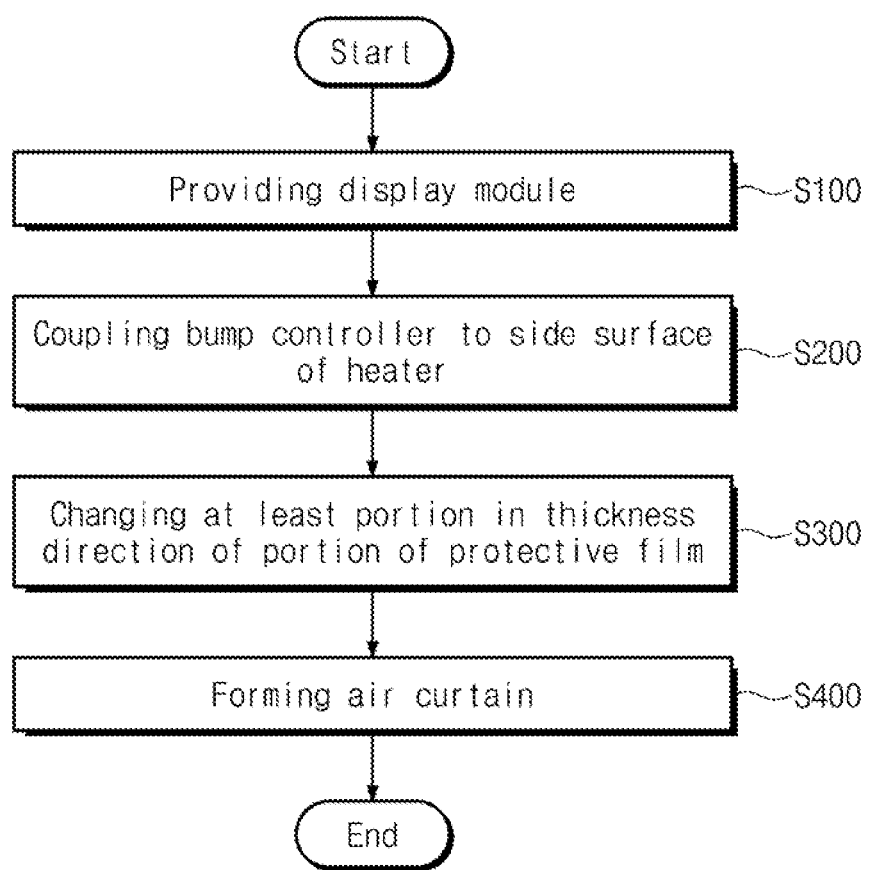

FIG. 9
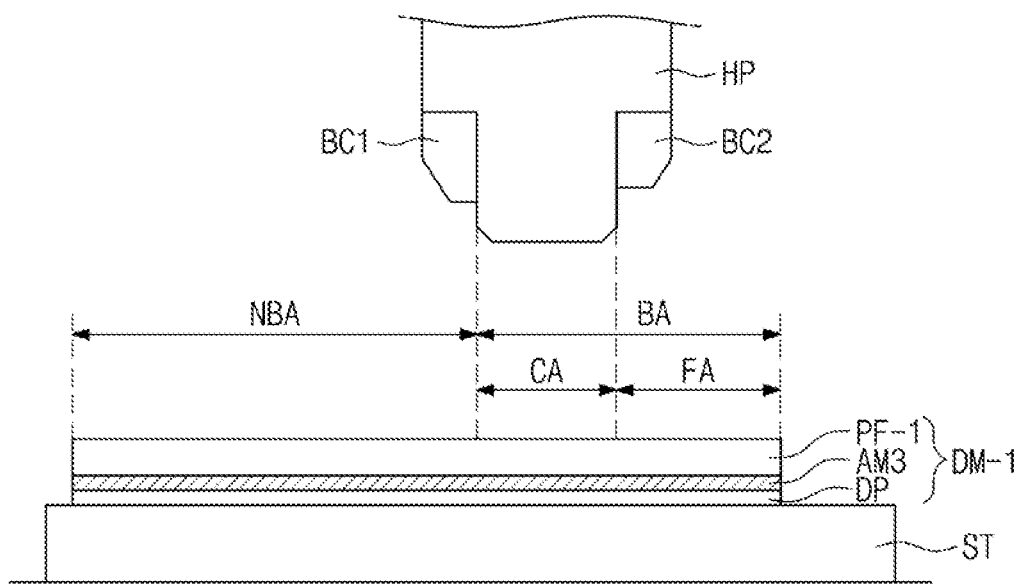
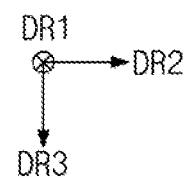

DISPLAY MODULE MANUFACTURING APPARATUS AND DISPLAY MODULE MANUFACTURING METHOD

CROSS-REFERENCE TO RELATED APPLICATION

This U.S. non-provisional patent application claims priority under 35 U.S.C. § 119 to Korean Patent Application No. 10-2020-0014492, filed on Feb. 6, 2020, the disclosure of which is incorporated by reference herein in its entirety.

TECHNICAL FIELD

Embodiments of the present disclosure relate to a display module manufacturing apparatus, and more particularly, to a display module manufacturing apparatus and a display module manufacturing method, which are capable of improving bending characteristics of the display module.

DISCUSSION OF RELATED ART

Electronic devices, such as smartphones, tablet computers, notebook computers, and smart televisions, are continuously being developed. These electronic devices may include a display module to provide information to consumers. The electronic devices may further include a variety of electronic modules in addition to the display module. The electronic devices may include a display module in which a portion thereof is bent to implement a slim bezel.

SUMMARY

Some embodiments of the present disclosure provide a display module manufacturing apparatus capable of improving bending characteristics of a display module.

Some embodiments of the present disclosure provide a display module manufacturing method capable of improving the bending characteristics of the display module.

According to some embodiments of the present disclosure, a display module manufacturing apparatus may include a stage on which a display module is disposed, a heater disposed on the stage, and configured to heat a first area of the display module, wherein the heater comprises a plurality of side surfaces and a contact surface, and a first bump controller detachably coupled to one side surface among the plurality of side surfaces and including a first bottom surface facing an upper surface of the stage. The contact surface may be closer to the upper surface of the stage than the first bottom surface.

In some embodiments, the first bottom surface may be flat.

In some embodiments, the first bottom surface may include a curved surface.

In some embodiments, at least a portion of the first bump controller may make contact with the side surface.

In some embodiments, the heater and the first bump controller may have different thermal conductivities from each other.

In some embodiments, the heater may extend in a first direction, the plurality of side surfaces may include first side surfaces facing each other in the first direction and second side surfaces facing each other in a second direction crossing the first direction, and the side surface coupled to the first bump controller may be one second side surface of the second side surfaces.

In some embodiments, the display module manufacturing apparatus may further include a second bump controller detachably coupled to another second side surface of the second side surfaces.

In some embodiments, the second bump controller may include a second bottom surface facing the stage, and a first distance between the upper surface of the stage and the first bottom surface may be different from a second distance between the upper surface of the stage and the second bottom surface.

In some embodiments, the display module manufacturing apparatus may further include a gas controller spaced apart from the upper surface of the stage in a third direction crossing the first direction and the second direction, and a distance between the upper surface of the stage and the contact surface of the heater may be smaller than or equal to a distance between the upper surface of the stage and the gas controller.

In some embodiments, the gas controller may include a spray unit that forms an air curtain.

In some embodiments, the gas controller may include a suction unit.

In some embodiments, the gas controller may be spaced apart from the heater in the first direction.

In some embodiments, the gas controller may be provided with an opening passing therethrough, and the opening has a circular shape.

In some embodiments, the gas controller may be inclined with respect to one of the first side surfaces.

In some embodiments, a first portion of the gas controller may be disposed in the heater, and a second portion of the gas controller may protrude from the heater in the third direction.

According to some embodiments of the present disclosure, a display module manufacturing method may include providing a display module comprising a display panel and a protective film attached to the display panel on a stage, coupling a bump controller to a side surface of a heater, and heating a portion of the protective film using the heater and the bump controller to modify at least a part of the portion of the protective film.

In some embodiments, the portion may include a first area and a second area adjacent to the first area, and when heating the portion of the protective film, the heater contacts and presses the first area.

In some embodiments, the portion of the protective film may be modified such that a thickness in the first area is smaller than a thickness in the second area.

In some embodiments, the method may further include sucking another portion of the protective film using a gas controller disposed on the stage.

In some embodiments, the method may further include forming an air curtain using a gas controller disposed on the stage.

According to embodiments of the present disclosure, the display module manufacturing apparatus may reduce the thickness of bumps formed on the protective film using the bump controller. The bumps may face each other when the display module is bent, but the bumps do not make contact with each other, and the interference due to the bumps may be reduced. Thus, the display module manufactured by the display module manufacturing apparatus may improve its bending characteristics.

BRIEF DESCRIPTION OF THE FIGURES

The above and other features of the inventive concept will become more apparent by describing in detail embodiments thereof with reference to the accompanying drawings, in which:

FIGS. 6A and 6B illustrate cross-sectional views showing a display module manufacturing apparatus according to an embodiment of the present disclosure;

FIG. 8 illustrates a flowchart showing a display module manufacturing method according to an embodiment of the present disclosure;

FIG. 9 illustrates a cross-sectional view showing a display module manufacturing method according to an embodiment of the present disclosure;

DETAILED DESCRIPTION OF THE EMBODIMENTS

Figure 1:
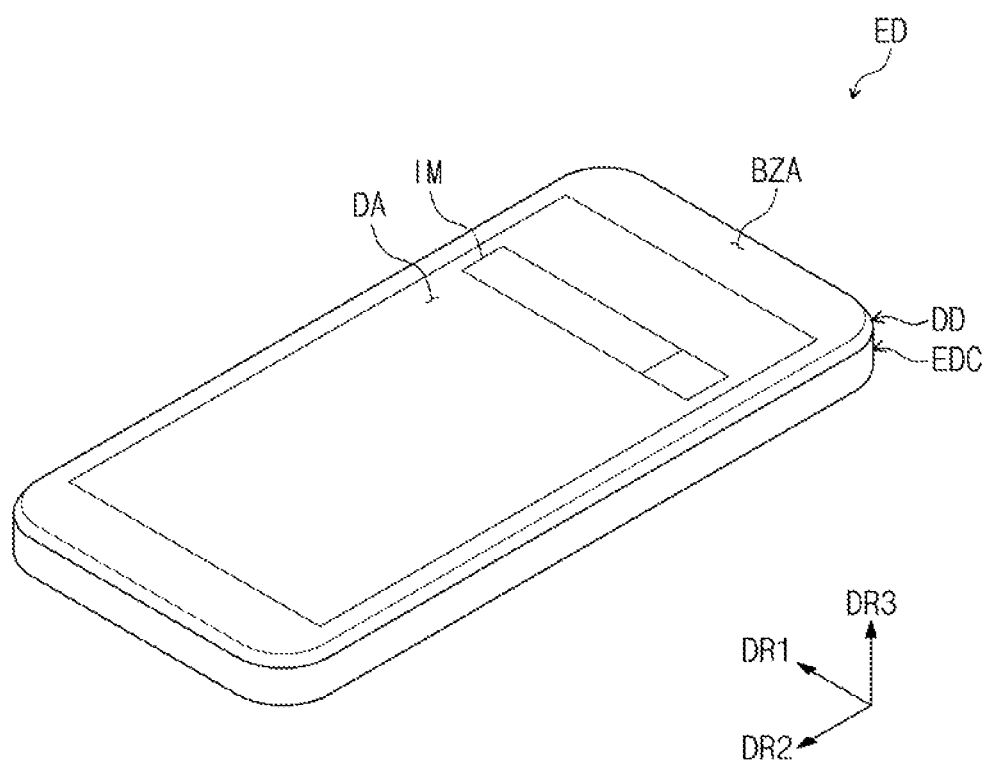
FIG. 1 illustrates a perspective view showing an electronic device according to an embodiment of the present disclosure.

Herein, it will be understood that when an element or layer is referred to as being "on", "connected to" or "coupled to" another element or layer, it can be directly on, connected or coupled to the other element or layer, or at least one intervening element or layer may be present therebetween.

Like reference numerals may refer to like elements throughout this specification. In addition, in the figures, thickness of layers, films or regions may be exaggerated for clarity.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections are not limited by these terms. These terms are only used to distinguish one element, component, region, layer or section from another region, layer or section. Thus, a first element, component, region, layer or section discussed below may be termed as a second element, component, region, layer or section without departing from the spirit and scope of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for convenience to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be explained in detail with reference to the accompanying drawings.

FIG. 1 illustrates a perspective view showing an electronic device ED according to an embodiment of the present disclosure.

Referring to FIG. 1, a smartphone is shown as a representative example of the electronic device ED. The present disclosure is not limited thereto or thereby. The electronic device ED may be a tablet computer, a notebook computer, a smart television, etc.

As shown in FIG. 1, a display surface on which an image IM is displayed may be substantially parallel to a surface located at a first direction DR1 and a second direction DR2. The display surface may include a display area DA and a bezel area BZA that is adjacent to the display area DA. FIG. 1 shows an internet search box as a representative example of the image IM. As an example, the display area DA may have a quadrangular shape. The bezel area BZA may surround or partially the display area DA. That is, the bezel area BZA may form an edge of the display surface.

A normal line direction of the display surface, i.e., a thickness direction of the electronic device ED, may indicate a third direction DR3. The third direction DR3 may cross the first direction DR1 and the second direction DR2. The first direction DR1, the second direction DR2, and the third direction DR3 may be substantially perpendicular to each other. Front (or upper) and rear (or lower) surfaces of each component may be distinct from each other in the direction in which the image IM is displayed.

Meanwhile, directions indicated by the first, second, and third directions DR1, DR2, and DR3 are relative to one another, and thus, the directions indicated by the first, second, and third directions DR1, DR2, and DR3 may be changed to other directions. In the descriptions below, the surface located at the first direction DR1 and the second direction DR2 may be referred to as a plane, and the expression "when viewed in a plane" may mean a state of being viewed in the third direction DR3.

The electronic device ED may include a display device DD and an external case EDC.

The external case EDC may be coupled to the display device DD. The external case EDC may provide an exterior of the electronic device ED. In an embodiment of the present disclosure, the external case EDC has a single body. In another embodiment, the external case EDC may include a plurality of frames and/or plates formed of glass, plastic, and metal.

Figure 2:
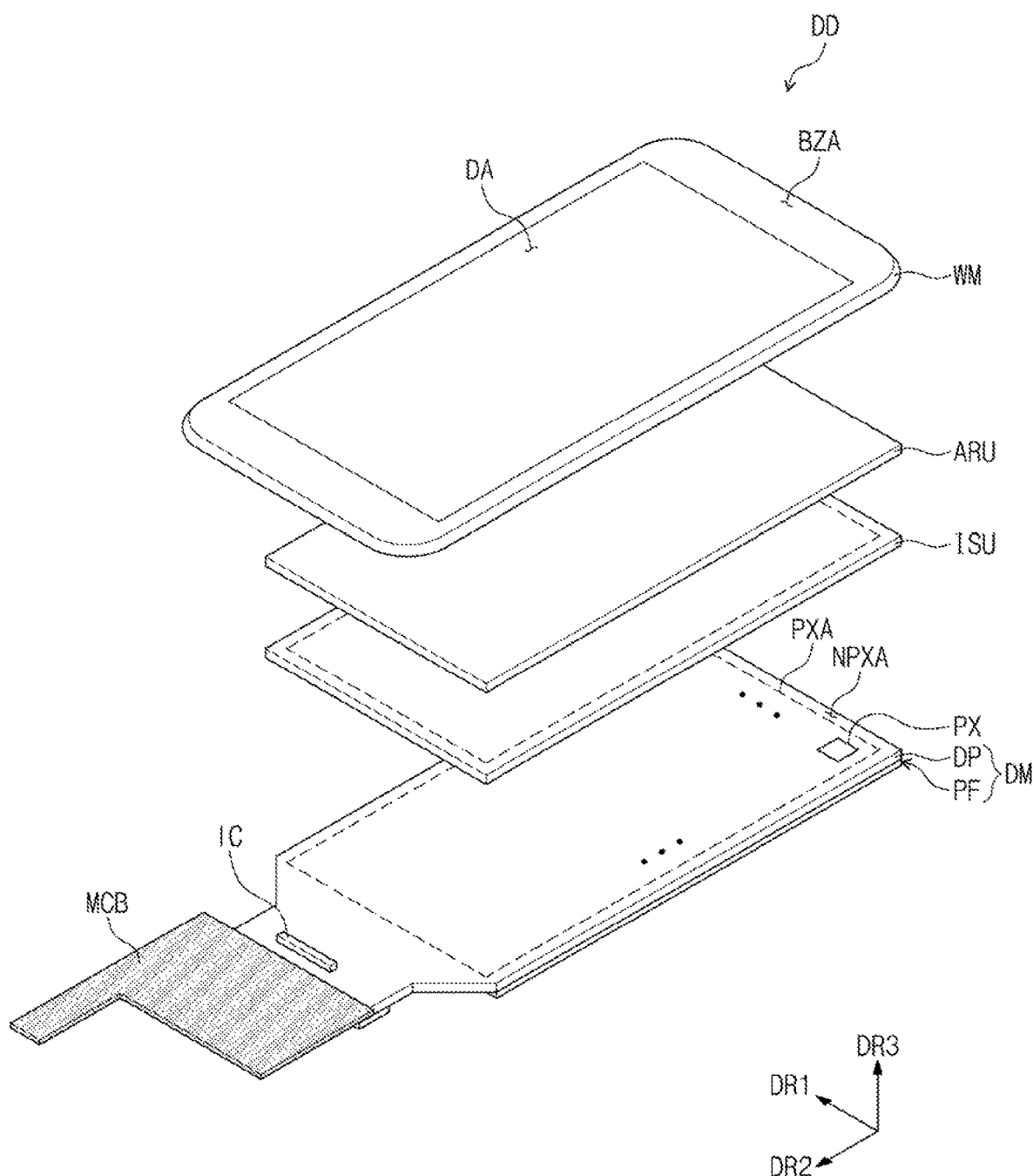
FIG. 2 illustrates an exploded perspective view showing a display device according to an embodiment of the present disclosure.
Figure 3:
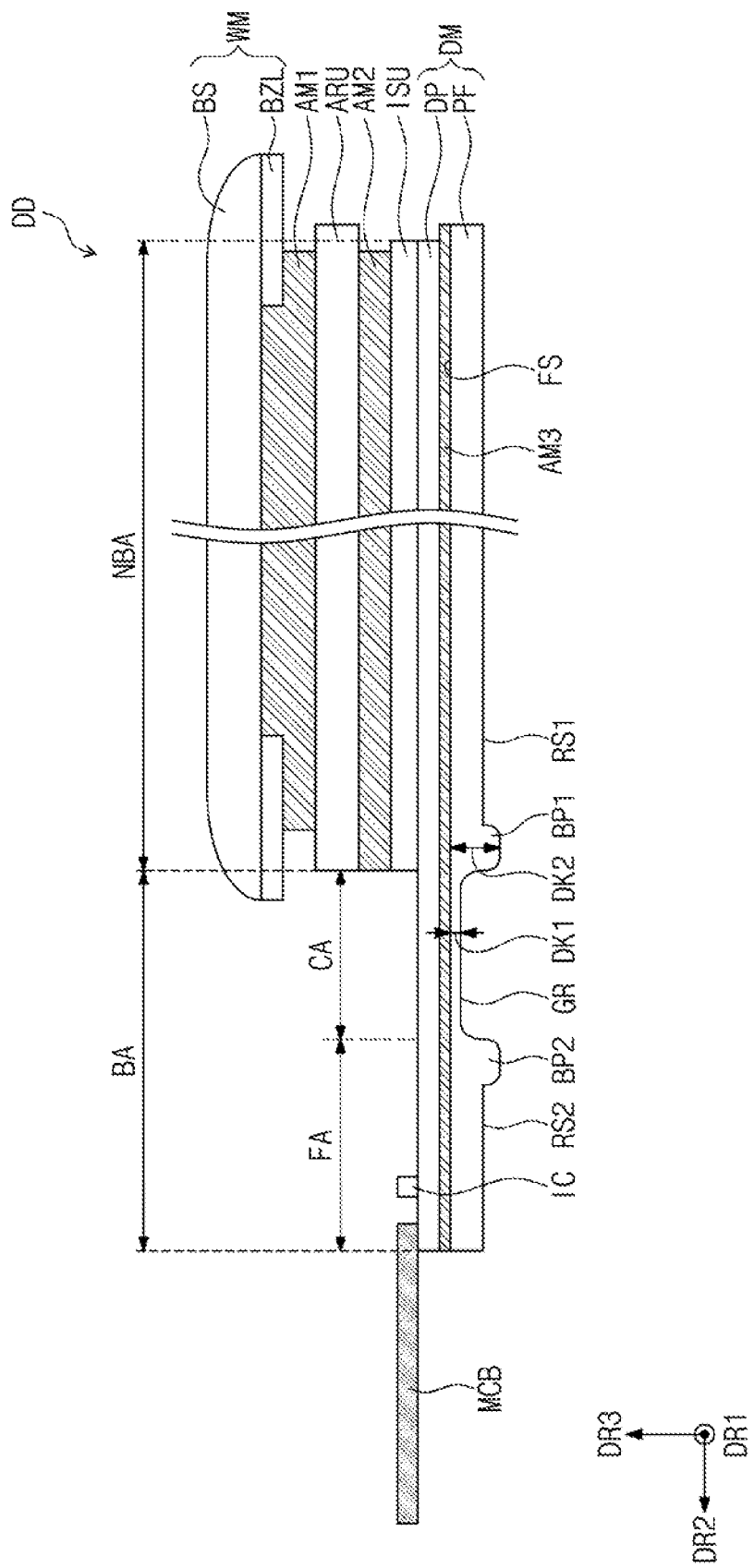
FIG. 3 illustrates a cross-sectional view showing a display device according to an embodiment of the present disclosure.
Figure 4:
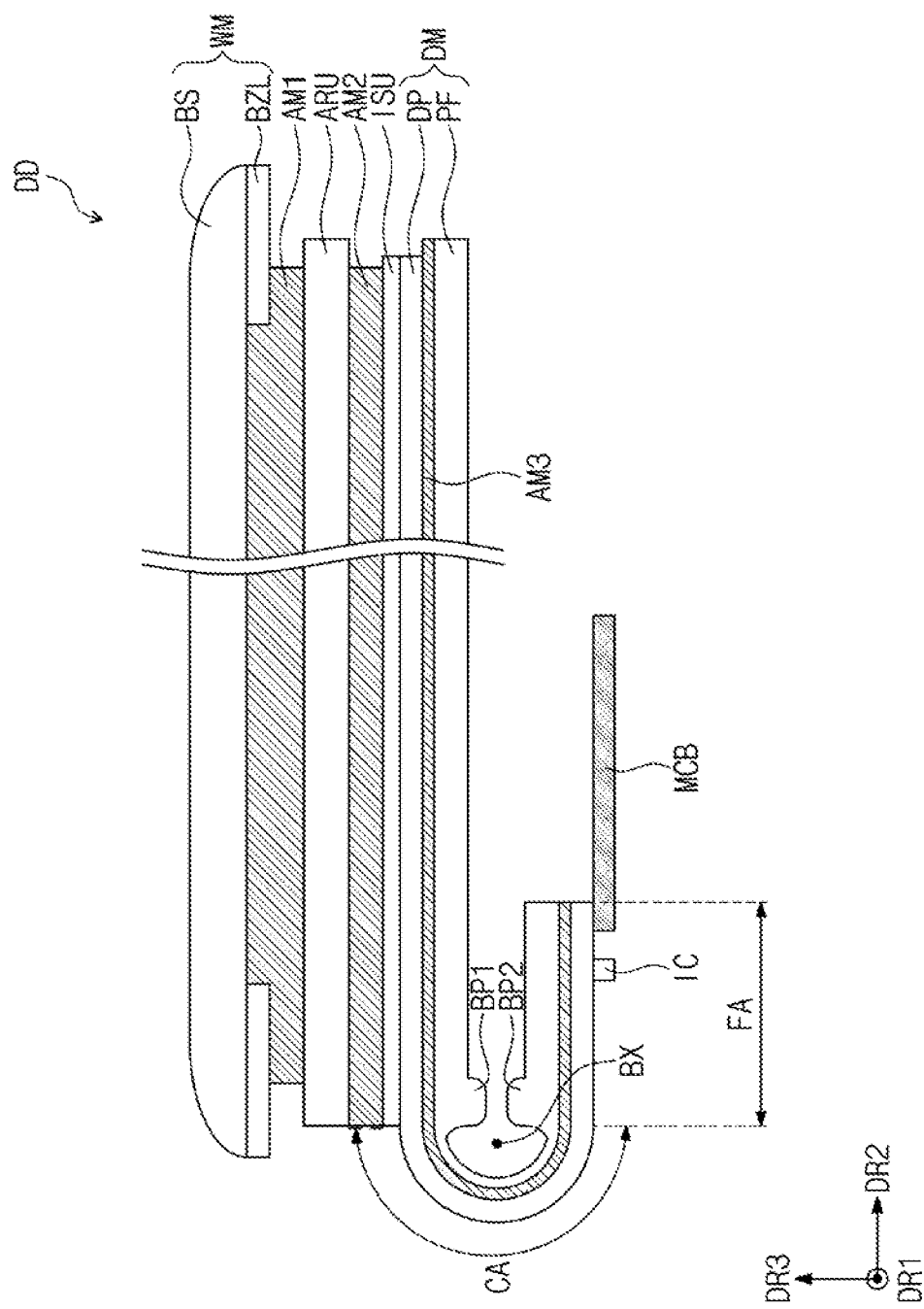
FIG. 4 illustrates a cross-sectional view showing a bent state of a display device according to an embodiment of the present disclosure.

FIG. 2 is an exploded perspective view showing the display device DD according to an embodiment of the present disclosure. According to an embodiment of the present disclosure, FIG. 3 is a cross-sectional view showing the display device DD. FIG. 4 is a cross-sectional view showing a bent state of the display device DD.

Referring to FIGS. 2 to 4, the display device DD may include a display module DM, a driving element IC, a circuit board MCB, an input sensor ISU, an optical film ARU, and a window WM.

The display module DM may include a bending area BA and a non-bending area NBA. The bending area BA may include a curvature area CA having a predetermined curvature in the bent state and a facing area FA facing at least a portion of the non-bending area NBA in the bent state. According to an embodiment, the facing area FA may be adjacent to the curvature area CA. The bending area BA of the display module DM may be bent about a bending axis BX at a predetermined radius of curvature. In an embodiment of the present disclosure, the display module DM may be bent about the bending axis BX extending in the first direction DR1. FIG. 3 shows the display module DM in an unfolded state (e.g., the display device DD is not in a bent state), and FIG. 4 shows the display module DM in the bent state.

The display module DM may include a display panel DP and a protective film PF.

The display panel DP may be a flexible display panel. The display panel DP may be a light-emitting type display panel, however, it is not limited thereto. For example, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot and a quantum rod.

When viewed in a plane, the display panel DP may include a pixel area PXA in which pixels PX are disposed and a non-pixel area NPXA adjacent to the pixel area PXA. The pixels PX are not disposed in the non-pixel area NPXA, and peripheral components such as signal lines and banks may be disposed in the non-pixel area NPXA. The non-pixel area NPXA may correspond to the bezel area BZA.

The protective film PF may be disposed on a rear surface of the display panel DP. In an embodiment of the present disclosure, a groove GR corresponding to the curvature area CA may be defined in the protective film PF. The groove GR may be formed by a heater HP (refer to FIG. 5). The groove GR may be formed by removing at least a portion of the protective film PF.

The protective film PF may include a plastic film as its base layer. The protective film PF may include a thermoplastic resin, for example, a plastic film containing any one selected from the group consisting of polyethylene terephthalate (PET), polyethylene (PE), polyvinylchloride (PVC), polypropylene (PP), polystyrene (PS), polyacrylonitrile (PAN), styrene-acrylonitrile copolymer (SAN), acrylonitrile-butadiene-styrene (ABS), polymethyl methacrylate (PMMA) and a combination thereof. In particular, the polyethylene terephthalate (PET) may have excellent heat resistance, stress-strength, and electrical properties, and may be less affected by temperature and humidity.

The protective film PF may include a first surface FS facing the rear surface of the display panel DP and a second surface RS1 and RS2 opposite to the first surface FS. The protective film PF may include a first bump BP1 and a second bump BP2. The first bump BP1 and the second bump BP2 may be arranged in the second direction DR2 to be adjacent to each other. The second surface RS1 and RS2 may include a first rear surface RS1 and a second rear surface RS2. The first rear surface RS1 and the second rear surface RS2 may be spaced apart from each other with the groove GR interposed therebetween. The first bump BP1 may be disposed on the first rear surface RS1. The second bump BP2 may be disposed on the second rear surface RS2. The first bump BP1 may overlap the non-bending area NBA. The second bump BP2 may overlap the facing area FA.

According to an embodiment of the present disclosure, a first thickness DK1 of the protective film PF overlapping the curvature area CA may be smaller than a second thickness DK2 of the protective film PF in areas in which the first bump BP1 and the second bump BP2 are respectively formed. In some cases, the second thickness DK2 of the protective film PF in area where the first bump BP1 is formed may be substantially the same as a thickness of the protective film PF in area where the second bump BP2 is formed. A bending stress generated in the curvature area CA may be reduced due to the first thickness DK1. The display module DM may be easily bent about the bending axis BX.

According to an embodiment of the present disclosure, the first bump BP1 and the second bump BP2 may not be in contact with each other in the bent state. A phenomenon in which the facing area FA is lifted up by the contact of the first bump BP1 and the second bump BP2 may be prevented. Accordingly, bending characteristics and product reliability of the display module DM can be improved.

The driving element IC may be mounted in an area overlapping the facing area FA of the display panel DP. The driving element IC may be mounted on the surface of the display panel DP. The driving element IC may output image signals and driving signals that are required to display the image. The image signals and the driving signals output from the driving element IC may be applied to the display panel DP. Meanwhile, the display panel DP shown in FIG. 2 includes one driving element. However, the number of the driving elements is not limited to one. The display panel DP may include a plurality of driving elements used to display the image.

The circuit board MCB may be electrically connected to the display panel DP. A portion of the circuit board MCB may be disposed on the display panel DP overlapping the facing area FA. The circuit board MCB may be a rigid circuit board or a flexible circuit board.

The input sensor ISU may be disposed on the display panel DP. The input sensor ISU may obtain coordinate information of an external input. The input sensor ISU may sense external inputs of various forms from the outside of the electronic device ED (refer to FIG. 1). For example, the input sensor ISU may sense an input by a part of user's body or may sense the external inputs of various forms, such as, light, heat, pressure, etc. In addition, the input sensor ISU may sense a proximity input applied when approaching close to a sensing surface as well as a touch input on the sensing surface.

The display panel DP and the input sensor ISU may be formed through successive processes. That is, the input sensor ISU may be formed directly on the display panel DP. However, the location of the input sensor ISU is not limited thereto or thereby. According to an embodiment of the present disclosure, the input sensor ISU and the display panel DP may be coupled to each other by an adhesive member disposed between the input sensor ISU and the display panel DP.

The optical film ARU may be disposed on the input sensor ISU. The optical film ARU may include a polarizing film and/or a retardation film. The number of the retardation films and a retardation length ($\lambda/4$ or $\lambda/2$) of the retardation film may be determined according to an operating principle of the optical film ARU. The optical film ARU may include color filters. According to an embodiment of the present disclosure, the optical film ARU may be optional and omitted.

The window WM may be disposed on the optical film ARU. The window WM may include a base member BS and a bezel layer BZL disposed on a rear surface of the base member BS. An area in which the bezel layer BZL is disposed may be referred to as the bezel area BZA (illustrated in FIG. 2). In an embodiment of the present disclosure, the window WM may have a flat shape in the display area DA, however, the shape of the window WM may be changed and have variations. Edges of the window WM may be provided in a curved surface.

The base member BS may include a glass substrate, a sapphire substrate, or a plastic substrate. The base member BS may have a single-layer or multi-layer structure. In one example, the base member BS may include a plurality of plastic films attached to each other by an adhesive. The base member BS may include a glass substrate and a plastic film attached to the glass substrate by an adhesive. The bezel layer BZL may have a single-layer or multi-layer structure.

The window WM may further include a functional coating layer (not shown) disposed on a front surface of the base member BS. The functional coating layer may include an anti-fingerprint layer, an anti-reflective layer, and a hard coating layer.

The display device DD may further include first, second, and third adhesive members AM1, AM2, and AM3. The first, second, and third adhesive members AM1, AM2, and AM3 may be a pressure sensitive adhesive (PSA) film, an optically clear adhesive (OCA) film, or an optically clear resin (OCR). The first, second, and third adhesive members AM1, AM2, and AM3 may include a light-curable adhesive material or a heat-curable adhesive material, and the material for the first, second, and third adhesive members AM1, AM2, and AM3 is not limited thereto. In addition, some of the first, second, and third adhesive members AM1, AM2, and AM3 may be optional and omitted.

The first adhesive member AM1 may be disposed between the window WM and the optical film ARU, and the window WM and the optical film ARU may be coupled to each other by the first adhesive member AM1. The second adhesive member AM2 may be disposed between the optical film ARU and the input sensor ISU, and the optical film ARU and the input sensor ISU may be coupled to each other by the second adhesive member AM2. The third adhesive member AM3 may be disposed between the protective film PF and the display panel DP, and the protective film PF and the display panel DP may be coupled to each other by the third adhesive member AM3.

Figure 5:
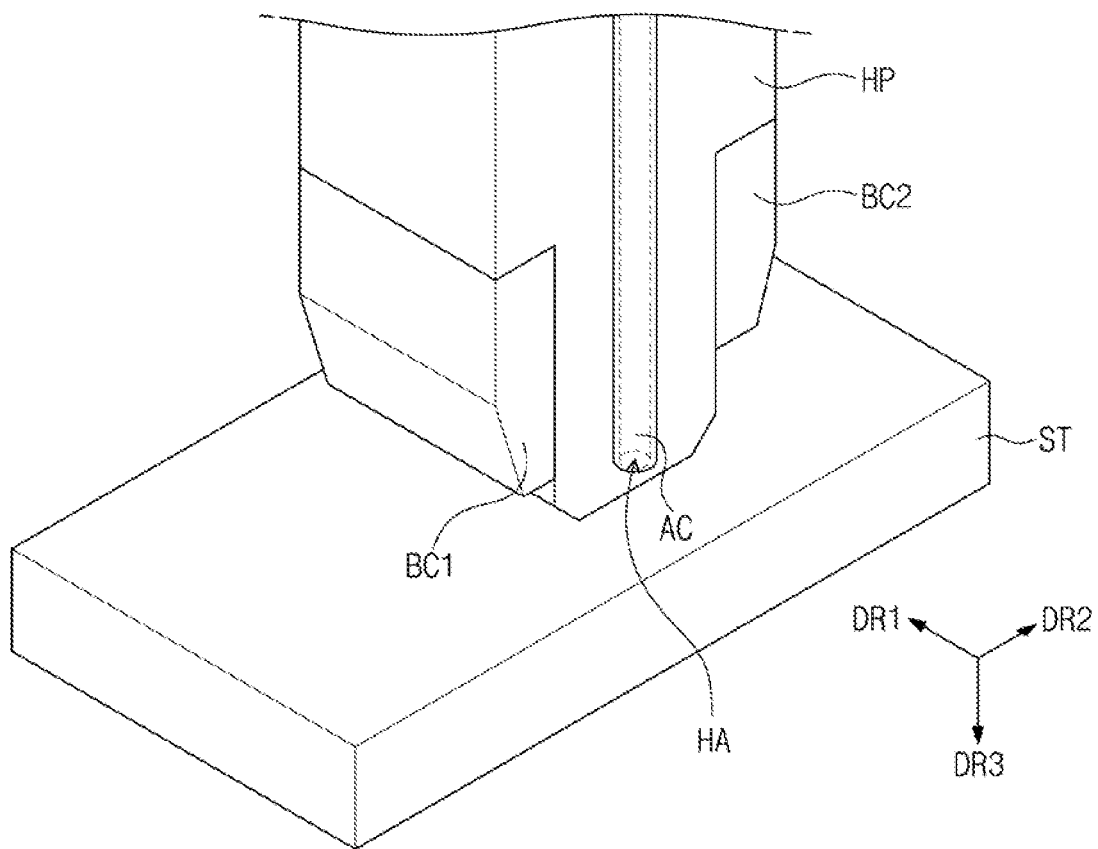
FIG. 5 illustrates a perspective view showing a display module manufacturing apparatus according to an embodiment of the present disclosure.

FIG. 5 is a perspective view showing a display module manufacturing apparatus according to an embodiment of the present disclosure, and FIG. 6A is a cross-sectional view showing a display module manufacturing apparatus according to an embodiment of the present disclosure.

Referring to FIGS. 5 and 6A, the display module manufacturing apparatus may include a stage ST, the heater HP, a first bump controller BC1, a second bump controller BC2, and a gas controller AC.

According to some embodiments of the present disclosure, the heater HP may be disposed above the stage ST. The heater HP may include a bar-shaped metal pillar extending in the first direction DR1. The heater HP may include stainless steel having good strength and durability or may include aluminum or copper having high thermal conductivity. A length in the first direction DR1 of the heater HP may be longer or shorter than a length in the first direction DR1 of the display module DM (refer to FIG. 2). The heater HP may include a plurality of side surfaces and a contact surface CS. The side surfaces may include first side surfaces HP-S1 (refer to FIG. 7a) facing each other in the first direction DR1 and second side surfaces HP-S2 respectively intersecting the first side surfaces HP-S1 (refer to FIG. 7a) and facing each other in the second direction DR2.

The first bump controller BC1 may be detachably coupled to one of the second side surfaces HP-S2. However, according to an embodiment of the present disclosure, the first bump controller BC1 is not limited thereto or thereby. For example, the first bump controller BC1 may be provided integrally with the heater HP.

The first bump controller BC1 may have a thermal conductivity different from that of the heater HP. However, the thermal conductivity of the first bump controller BC1 is not limited thereto or thereby. For example, a thermal conductivity of the first bump controller BC) may be substantially the same as a thermal conductivity of the heater HP.

The first bump controller BC1 may include a first bottom surface BS1 facing an upper surface ST-S of the stage ST. The contact surface CS may protrude in the third direction DR3 from the first bottom surface BS1 by a predetermined thickness TH1. For example, a first distance HT1 between the upper surface ST-S of the stage ST and the contact surface CS may be smaller than a second distance HT2 between the upper surface ST-S of the stage ST and the first bottom surface BS1.

The second bump controller BC2 may be detachably coupled to one of the second side surfaces HP-S2. However, the second bump controller BC2 is not limited thereto or thereby. According to an embodiment of the present disclosure, the second bump controller BC2 may be provided integrally with the heater HP. The second bump controller BC2 may include a second bottom surface BS2 facing the upper surface ST-S of the stage ST. The second distance HT2 between the upper surface ST-S of the stage ST and the first bottom surface BS1 may be substantially the same as a third distance HT3 between the upper surface ST-S of the stage ST and the second bottom surface BS2. However, the first bump controller BC1 and the second bump controller BC2 is not limited thereto or thereby. According to an embodiment of the present disclosure, the second bump controller BC2 may be optional and omitted.

The second bump controller BC2 may have the same thermal conductivity as that of the first bump controller BC1. For example, the first bump controller BC1 and the second bump controller BC2 may include the same material. The second bump controller BC2 may have the thermal conductivity different from that of the heater HP. However, the thermal conductivity of the second bump controller BC2 is not limited thereto or thereby. According to an embodiment of the present disclosure, the second bump controller BC2 may have substantially the same thermal conductivity as the thermal conductivity of the heater HP, and the thermal conductivity of the second bump controller BC2 may be changed depending on display module manufacturing conditions.

The first bump controller BC1 and the second bump controller BC2 may be detachably coupled to the second side surfaces HP-S2, respectively. Each of the first bump controller BC1 and the second bump controller BC2 may be configured in various ways depending on the display module manufacturing conditions or the type of protective film PF (refer to FIG. 4). The display module manufacturing conditions may include a heating temperature of the heater HP, a contact time of the heater HP, a pressure from the heater HP, a thickness and a shape of each of the first bump BP1 (refer to FIG. 4) and the second bump BP2 (refer to FIG. 4) to be manufactured, and a position of the curvature area CA (refer to FIG. 4).

Figure 6B:
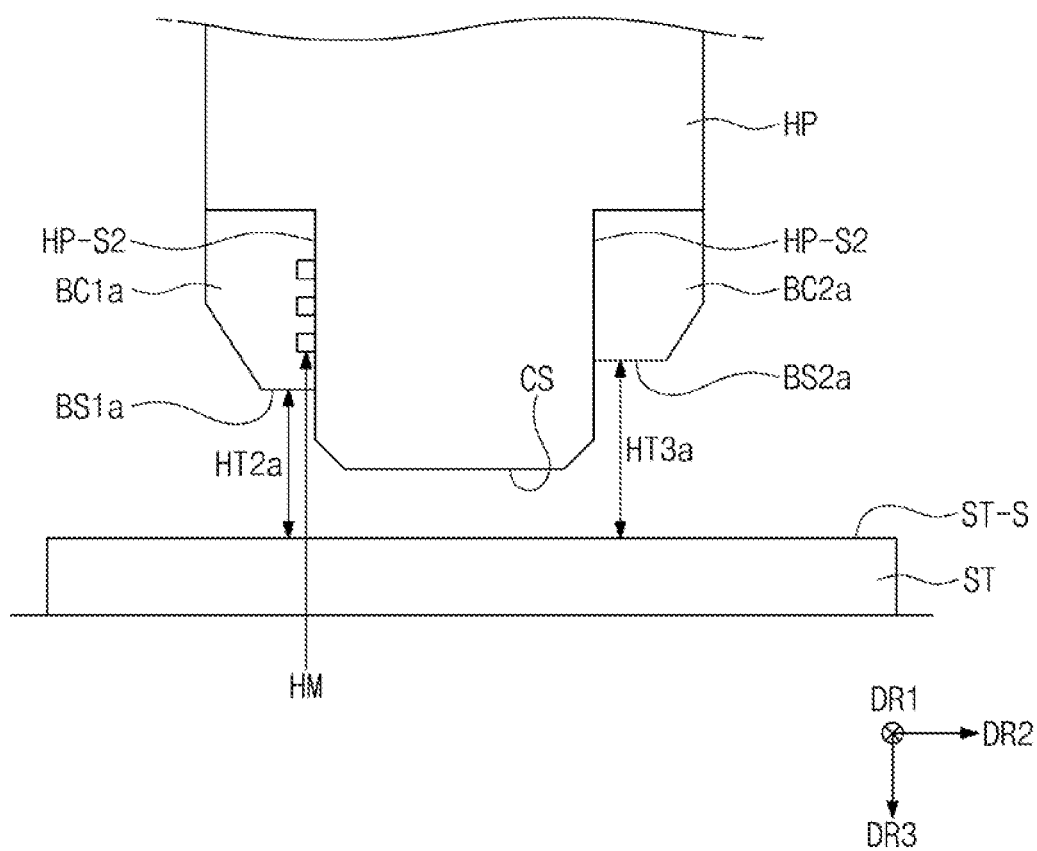

FIG. 6B is a cross-sectional view showing a display module manufacturing apparatus according to an embodiment of the present disclosure. In FIG. 6B, the same reference numerals denote the same elements in FIG. 6A, and thus, detailed descriptions of the same elements will be omitted.

Referring to FIG. 6B, at least a portion of a first bump controller BC1a may make contact with a second side surface HP-S2 of a heater HP. At least one recess HM may be located on a surface of the first bump controller BC1a and a surface of the second side surface HP-S2, which makes contact with the surface of the first bump controller BC1a. A contact surface between the first bump controller BC1a and the heater HP may be adjusted by using the at least one recess HM, and thus, heat provided from the heater HP may be controlled.

A second distance HT2a between an upper surface ST-S of a stage ST and a first bottom surface BS1a of the first bump controller BC1a may be different from a third distance HT3a between the upper surface ST-S of the stage ST and a second bottom surface BS2a of a second bump controller BC2a. In some cases, recess HM may not be located on a surface of the second bump controller BC2a and a surface of the second side surface HP-S2 (as shown in FIG. 6B).

Figure 7A:
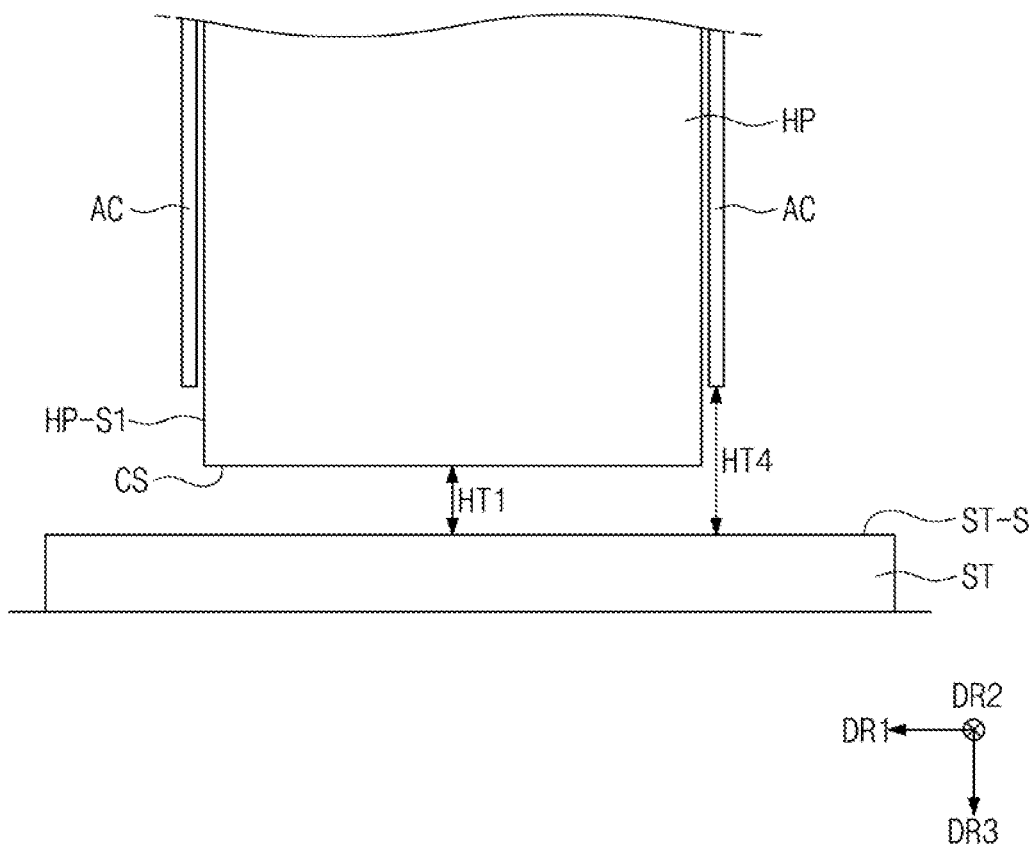
FIGS. 7A, 7B and 7C illustrate cross-sectional views showing a display module manufacturing apparatus according to an embodiment of the present disclosure.

FIG. 7A is a cross-sectional view showing a display module manufacturing apparatus according to an embodiment of the present disclosure.

Referring to FIG. 7A, the gas controller AC may be spaced apart from an upper surface ST-S of a stage ST in the third direction DR3. The gas controller AC may be disposed to be spaced apart from a first side surface HP-S1 in the first direction DR1. The display module manufacturing apparatus may include a plurality of gas controllers AC. The gas controllers AC may be spaced apart from each other with a heater HP interposed therebetween in the first direction DR1. A distance HT1 between the upper surface ST-S of the stage ST and a contact surface CS of the heater HP may be smaller than or equal to a fourth distance HT4 between the upper surface ST-S of the stage ST and the gas controller AC.

The gas controller AC may be provided with an opening HA therein (refer to FIG. 5). The opening HA may have a circular shape. However, the shape of the opening HA is not limited thereto or thereby. According to an embodiment of the present disclosure, the opening HA may have a polygonal shape.

Figure 7B:
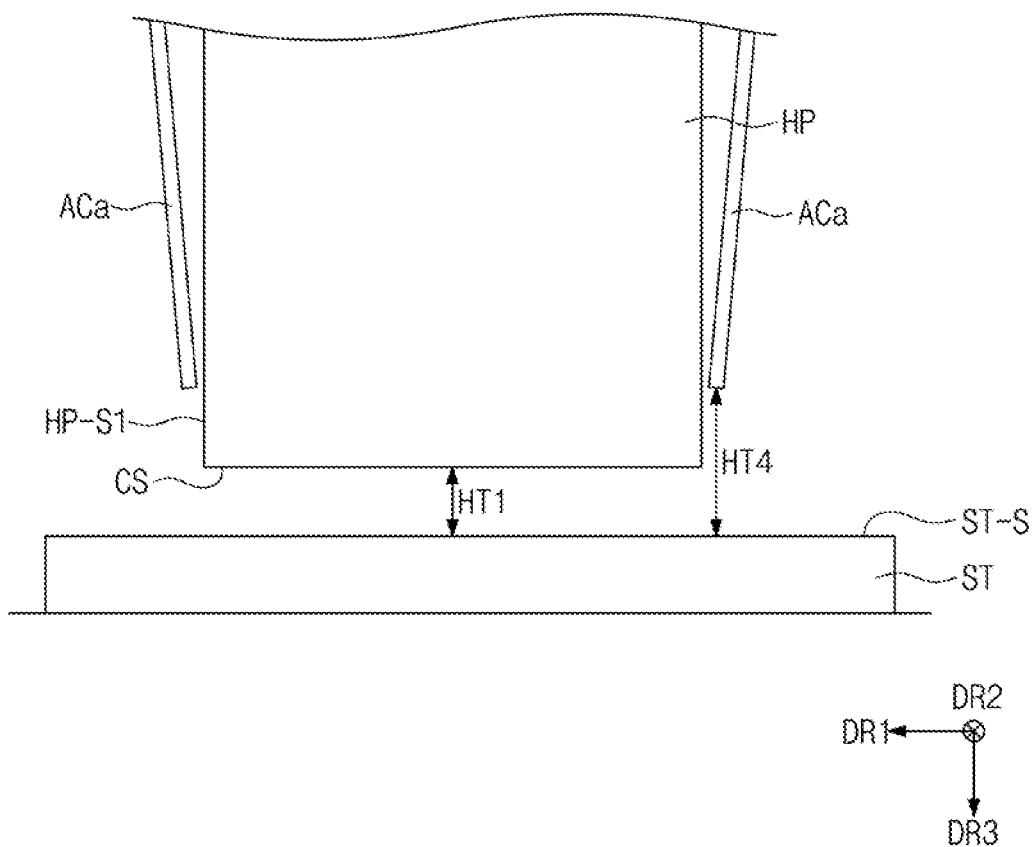

FIG. 7B is a cross-sectional view showing a display module manufacturing apparatus according to an embodiment of the present disclosure. In FIG. 7B, the same reference numerals denote the same elements in FIG. 7A, and thus, detailed descriptions of the same elements will be omitted.

Referring to FIG. 7B, a gas controller ACa may be inclined with respect to a first side surface HP-S1. In other words, the gas controller ACa may not be parallel to the third direction DR3, but have an angle with regard to the third direction DR3. The gas controller ACa may spray a gas to the display module DM (refer to FIG. 4) disposed on a stage ST or may suck the gas, and thus, a residual layer may be prevented from being formed on the protective film PF (refer to FIG. 4). According to an embodiment of the present disclosure, the display module manufacturing apparatus may include a plurality of gas controllers ACa. Each of the gas controllers ACa may be spaced apart from each other with a heater HP interposed therebetween in the first direction DR1. The gas controller ACa may be spaced apart from a first side surface HP-S1 in the first direction DR1.

Figure 7C:
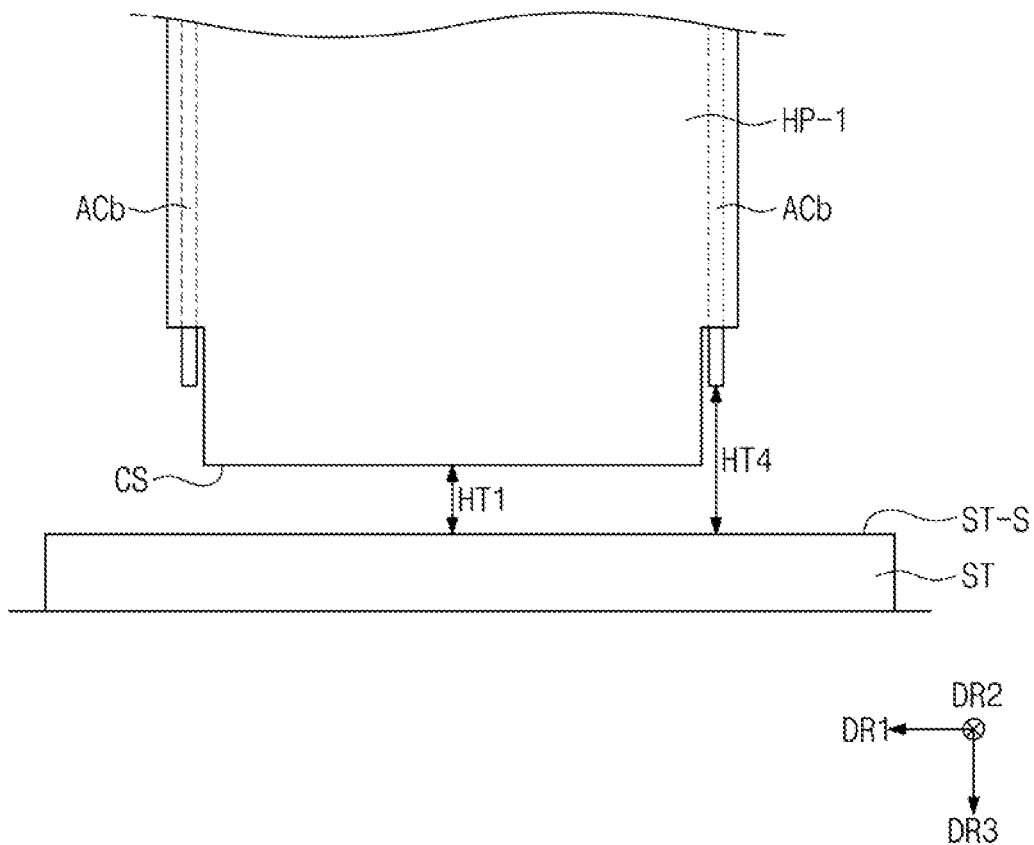

FIG. 7C is a cross-sectional view showing a display module manufacturing apparatus according to an embodiment of the present disclosure. In FIG. 7C, the same reference numerals denote the same elements in FIG. 7A, and thus, detailed descriptions of the same elements will be omitted.

Referring to FIG. 7C, a portion of a gas controller ACb may be disposed inside a heater HP-1, and the other portion of the gas controller ACb may protrude in the third direction DR3 from the heater HP-1.

The gas controller ACb may spray a gas to the display module DM (refer to FIG. 4) disposed on the stage ST, and thus, a residual layer may be prevent from being formed on the protective film PF (refer to FIG. 4). The gas may receive the heat from the heater HP-1 while passing through the portion of the gas controller ACb. The protective film PF (refer to FIG. 4) may be easily manufactured by using the heated gas. However, the operation of the gas controller ACb is not limited thereto or thereby. In an embodiment of the present disclosure, the gas controller ACb may suck the gas to prevent the residual layer from being formed on the protective film PF (refer to FIG. 4).

According to an embodiment of the present disclosure, a distance HT1 between the upper surface ST-S of the stage ST and a contact surface CS of the heater HP-1 may be smaller than or equal to a fourth distance HT4 between the upper surface ST-S of the stage ST and the gas controller ACb.

FIG. 8 is a flowchart showing a display module manufacturing method according to an embodiment of the present disclosure, and FIG. 9 is a cross-sectional view showing a display module manufacturing method according to an embodiment of the present disclosure.

Referring to FIGS. 8 and 9, a preliminary display module DM-1 in which the bending area BA and the non-bending area NBA are located may be provided on the stage ST (S100). The display panel DP may be disposed on the stage ST, and a preliminary protective film PF-1 may be disposed on the display panel DP. The third adhesive member AM3 may be disposed between the display panel DP and the preliminary protective film PF-1.

The first bump controller BC1 and the second bump controller BC2 may be respectively coupled to the second side surfaces HP-S2 of the heater HP, which face each other in the second direction DR2 (S200). Each of the first bump controller BC1 and the second bump controller BC2 may be detachably coupled to the heater HP. Each of the first bump controller BC1 and the second bump controller BC2 may be provided in various ways depending on the display module manufacturing conditions or the type of the preliminary protective film PF-1.

A bending area BA may include a facing area FA and a curvature area CA. According to an embodiment of the present disclosure, the contact surface CS may protrude in the third direction DR3 from the first bottom surface BS1 by a predetermined thickness (as illustrated in FIG. 6A). The contact surface CS may correspond to the curvature area CA. The curvature area CA may be adjacent to the facing area FA.

The heater HP may be disposed on the preliminary protective film PF-1 to melt the bending area BA.

Figure 10A:
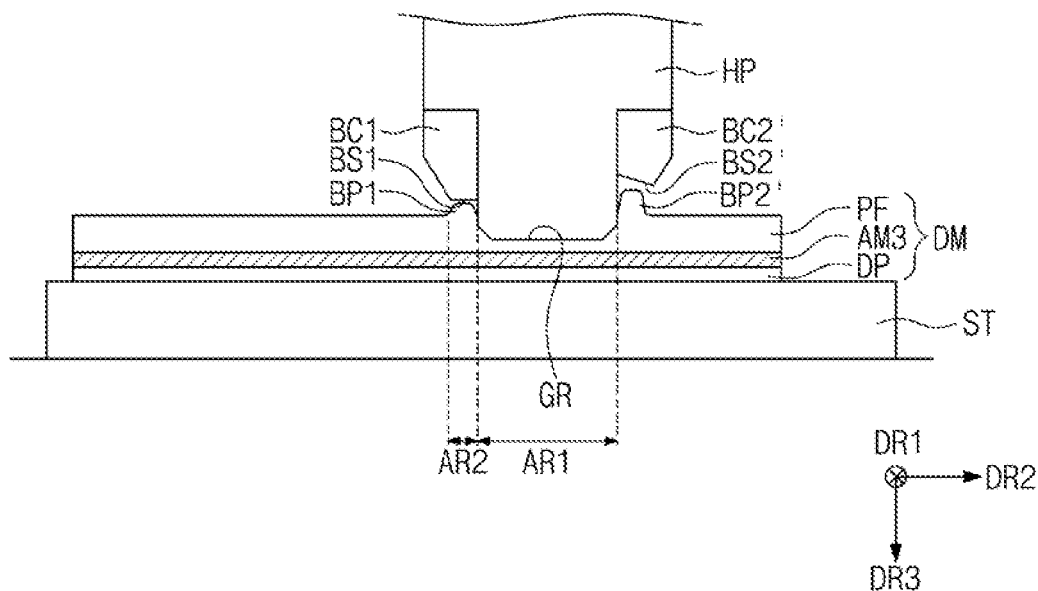
FIGS. 10A, 10B, and 10C illustrate cross-sectional views showing a display module manufacturing method according to an embodiment of the present disclosure.

FIG. 10A is a cross-sectional view showing a display module manufacturing method according to an embodiment of the present disclosure.

Referring to FIGS. 8 and 10A, the heater HP may heat and press the preliminary protective film PF-1 to form the protective film PF. The heater HP may be disposed above a first area AR1. The first area AR1 may correspond to the curvature area CA.

The heater HP may press the preliminary protective film PF-1 while being heated to a temperature higher than a sublimation temperature of the preliminary protective film PF-1. For example, when a polyethylene terephthalate (PET) film is used as the preliminary protective film PF-1, the heater HP may be heated to a temperature higher than about 250 Celsius degrees. A maximum temperature of the heater HP may be determined by taking into account the display panel DP. The heating temperature of the heater HP may be set to a temperature at which the preliminary protective film PF-1 is sublimed, but thermal damage does not occur on the display panel DP. For example, when the base layer of the display panel DP includes polyimide, the maximum heating temperature of the heater HP may be lower than about 600 Celsius degrees.

At least a portion of the first area AR1 of the protective film PF in the third direction DR3 may be changed by the heater HP (S300). The heater HP may be in contact with the first area AR1 and may press the protective film PF. The portion of the protective film PF in the first area AR1 may be melted by the heating temperature of the heater HP, and the groove GR may be formed on the protective film PF. The groove GR may be formed by removing at least a portion of the protective film PF.

The first bottom surface BS1 of the first bump controller BC1 may be flat. The display module manufacturing apparatus may control the shape of the first bump BP1 using the first bottom surface BS1.

A plastic resin may be accumulated in a second area AR2 adjacent to the first area AR1 in the second direction DR2 in the process in which the protective film PF is melted by the heater HP, and thus, the first bump BP1 may be formed. The first bump BP1 may be disposed to be spaced apart from the first bump controller BC1 in the third direction DR3. The first bump BP1 may not be in contact with the first bump controller BC1. In other words, a space or an area may exist between the first bump BP1 and the first bump controller BC1. Thus, an influence of the applied pressure on the display module DM may be minimized. The first bump controller BC1 may receive the heat from the heater HP, and the first bump controller BC1 may apply a first heat to the first bump BP1. The first bump BP1 may be melted by the first heat, and thus, a thickness of the first bump BP1 may be reduced.

A second bottom surface BS2' of a second bump controller BC2' may be inclined. The display module manufacturing apparatus may control a shape of a second bump BP2' using the second bottom surface BS2'. According to an embodiment of the present disclosure, the second bottom surface BS2' may not be flat. A shape of the second bottom surface BS2' may be different from a shape of the first bottom surface BS1.

The second bump BP2' may be formed to be spaced apart from the first bump BP1 with the groove GR interposed therebetween. The second bump BP2' may not be in contact with the second bump controller BC2'. The second bump controller BC2' may receive the heat from the heater HP, and the second bump controller BC2' may apply a second heat to the second bump BP2'. The second bump BP2' may be melted by the second heat, and thus, a thickness of the second bump BP2' may be reduced.

According to some embodiments of the present disclosure, the display module manufacturing apparatus may reduce the thickness of each of the first bump BP1 and the second bump BP2'. The radius of curvature required when the display device DD (refer to FIG. 4) is bent may be reduced by the first bump BP1 and the second bump BP2' having the reduced thickness. Accordingly, the display module DM that is slim may be manufactured by the display module manufacturing apparatus. In addition, although the first bump BP1 and the second bump BP2' face each other when the display device DD (refer to FIG. 4) is bent, the first bump BP1 and the second bump BP2' may not be in contact with each other. Therefore, the phenomenon in which the facing area FA is lifted up by the contact between the first bump BP1 and the second bump BP2' may be prevented. Interference caused by the first bump BP1 and the second bump BP2' may be minimized. Thus, the display module manufacturing apparatus that manufactures the display module DM with improved bending characteristics is provided.

Figure 10B:
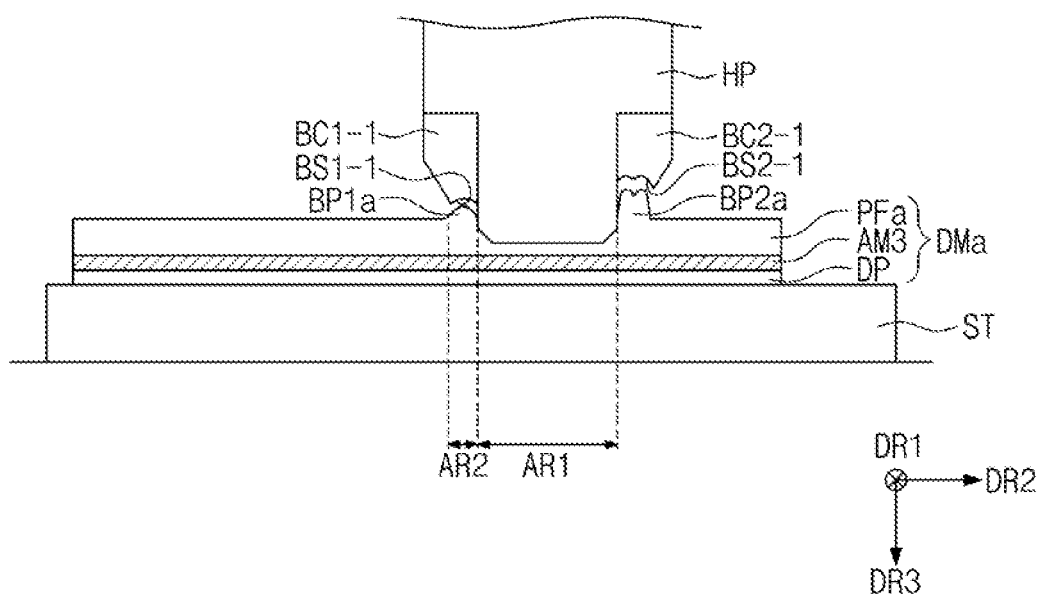

FIG. 10B is a cross-sectional view showing a display module manufacturing method according to an embodiment of the present disclosure. In FIG. 10B, the same reference numerals denote the same elements in FIG. 10A, and thus, detailed descriptions of the same elements will be omitted.

Referring to FIGS. 10A and 10B, a first bottom surface BS1-1 of a first bump controller BC1-1 may have a curved surface. FIG. 10B shows a concave first bottom surface BS1-1. However, the first bottom surface BS1-1 is not limited thereto or thereby. According to an embodiment of the present disclosure, the first bottom surface BS1-1 may have a convex shape.

A second bottom surface BS2-1 of a second bump controller BC2-1 may include at least one curved surface.

According to some embodiments of the present disclosure, the display module manufacturing apparatus may control a shape of a first bump BP1$a$ and a second bump BP2$a$. The shape of the first bump BP1$a$ and the shape of the second bump BP2$a$ may be controlled or changed by the shape of the first bottom surface BS1-1 and the second bottom surface BS2-1, respectively. In addition, the shape or size of the first bump BP1$a$ may not be the same as the shape or size of the second bump BP2$a$. Although the first bump BP1$a$ and the second bump BP2$a$ face each other when the display device DD (refer to FIG. 4) is bent, the first bump BP1$a$ and the second bump BP2$a$ may not be in contact with each other. Therefore, the phenomenon in which the facing area FA is lifted up by the contact between the first bump BP1$a$ and the second bump BP2$a$ may be prevented. Interference caused by the first bump BP1$a$ and the second bump BP2$a$ may be minimized. Thus, a display module manufacturing apparatus that manufactures a display module DMa with improved bending characteristics is provided.

Figure 10C:
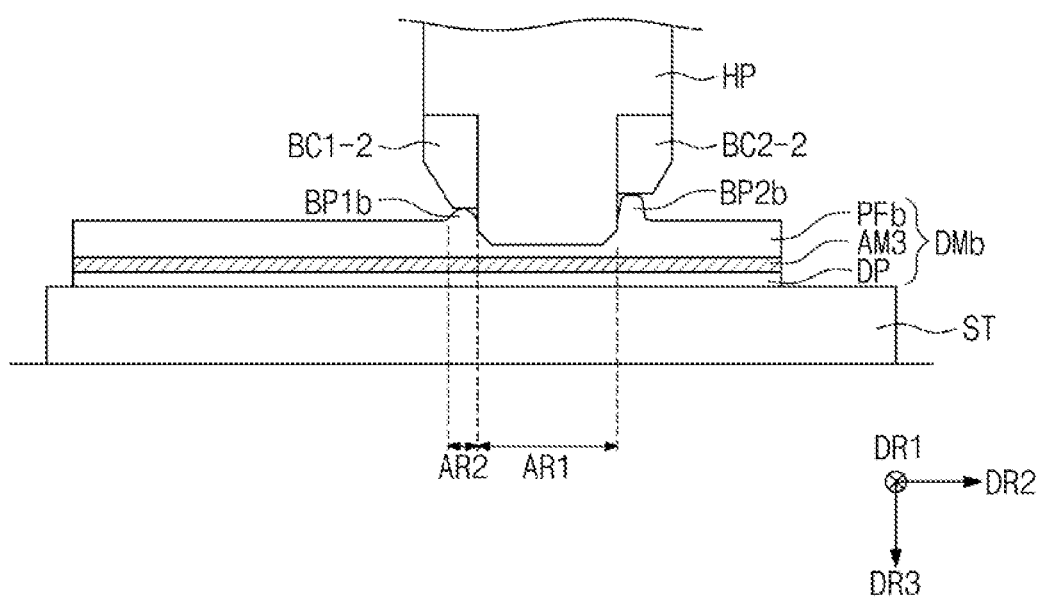

FIG. 10C is a cross-sectional view showing a display module manufacturing method according to an embodiment of the present disclosure. In FIG. 10C, the same reference numerals denote the same elements in FIG. 10A, and thus, detailed descriptions of the same elements will be omitted.

Referring to FIGS. 10A and 10C, a first bump controller BC1-2 may be in contact with the second area AR2 and may press the second area AR2. The first bump controller BC1-2 may be in contact with a first bump BP1$b$. A second bump controller BC2-2 may be in contact with a second bump BP2$b$. The first bump BP1$b$ and the second bump BP2$b$ may have a height in the third direction DR3 controlled by the first bump controller BC1-2 and the second bump controller BC2-2, respectively.

According to an embodiment of the present disclosure, a shape or size of the first bump controller BC1-2 may not be same as a shape or size of the second bump controller BC2-2.

According to some embodiments of the present disclosure, the display module manufacturing apparatus may control the height of each of the first bump BP1$b$ and the second bump BP2b. Although the first bump BP1b and the second bump BP2b face each other when the display device DD (refer to FIG. 4) is bent, the first bump BP1b and the second bump BP2b may not be in contact with each other. Accordingly, the phenomenon in which the facing area FA is lifted up by the contact between the first bump BP1b and the second bump BP2b may be prevented. Interference caused by the first bump BP1b and the second bump BP2b may be minimized. Thus, a display module manufacturing apparatus that manufactures a display module DMb with improved bending characteristics is provided.

Figure 11A:
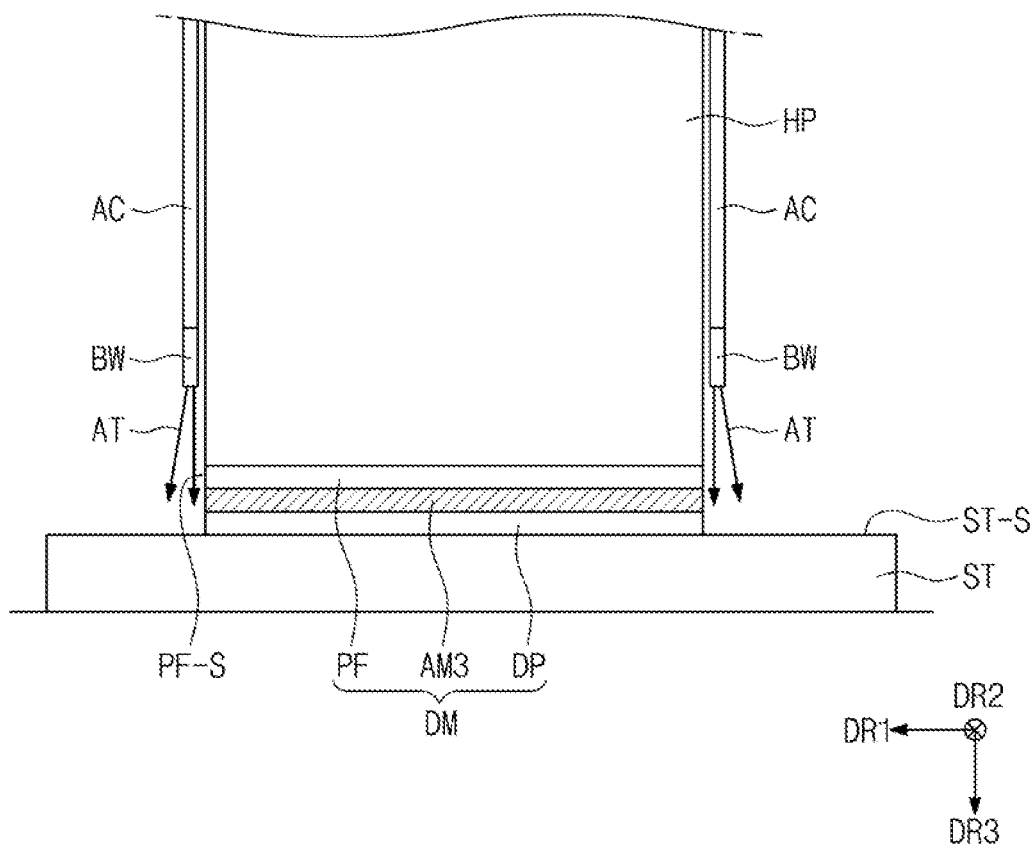
FIGS. 11A and 11B illustrate cross-sectional views showing a display module manufacturing method according to an embodiment of the present disclosure.

FIG. 11A is a cross-sectional view showing a display module manufacturing method according to an embodiment of the present disclosure.

Referring to FIGS. 8 and 11A, a gas controller AC may be disposed to be spaced apart from a heater HP in the first direction DR1. The gas controller AC may include a spray unit BW that forms an air curtain AT. The gas controller AC may form the air curtain AT (S400).

The spray unit BW may continuously form the air curtain AT while the heater HP changes (S300) at least a portion in the third direction DR3 of the first area AR1 of the protective film PF. However, the operation or function of the spray unit BW is not limited thereto or thereby. According to an embodiment of the present disclosure, the spray unit BW may form the air curtain AT at a predetermined period.

The air sprayed by the spray unit BW may have a high temperature due to the heat provided from the heater HP. However, temperature of the air is not limited thereto or thereby. According to an embodiment of the present disclosure, the air may be spaced apart from the heater HP, and thus, the temperature of the air sprayed may be lowered. In some cases, the temperature of the air sprayed may be lower than a temperature of the heat from the heater HP.

The air curtain AT may prevent a residual layer, which is formed by a plastic resin accumulated at opposite ends spaced apart from each other in the first direction DR1 of the protective film PF when the protective film PF is melted by the heater HP, from protruding in the first direction DR1 from a side surface PF-S of the protective film PF.

According to some embodiments of the present disclosure, the display module manufacturing apparatus may prevent the residual layer from protruding in the first direction DR1 from the side surface PF-S of the protective film PF. The display module manufacturing apparatus may prevent defects from occurring when the display device DD (refer to FIG. 4) is bent in the state in which the residual layer is protruded and at least a portion of the residual layer is separated from the protective film PF. Accordingly, the display module manufacturing apparatus may manufacture the display module DM with improved reliability.

Figure 11B:
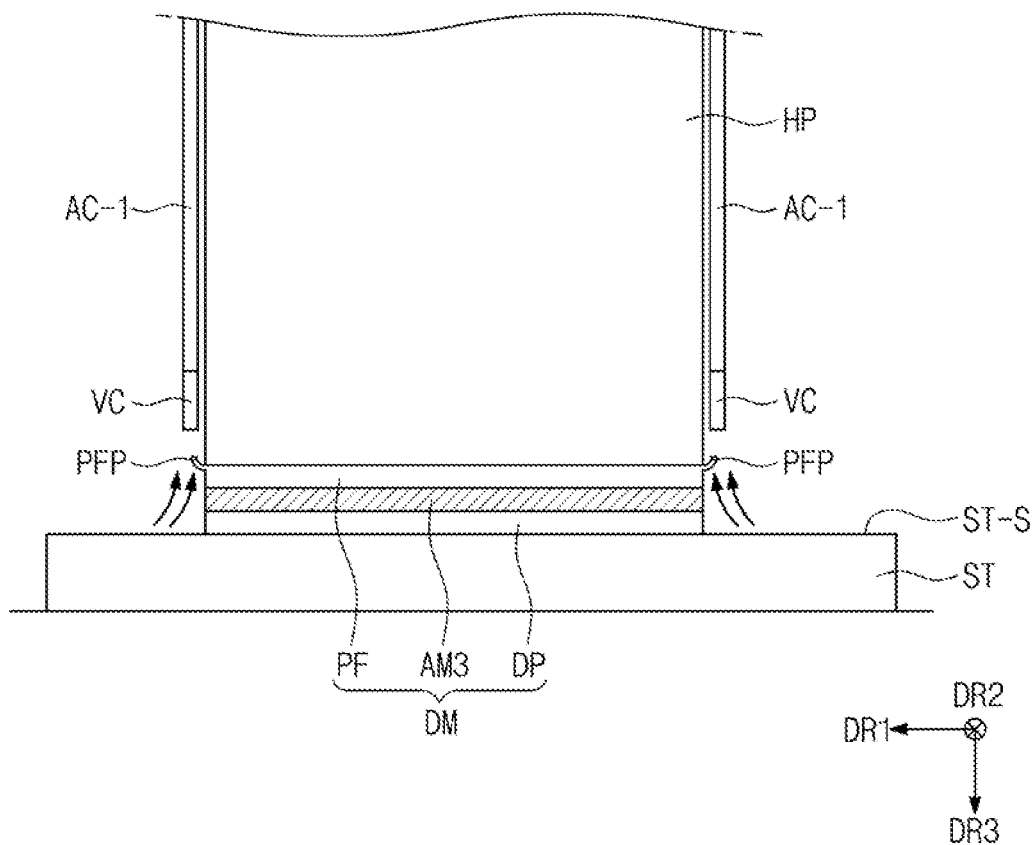

FIG. 11B is a cross-sectional view showing a display module manufacturing method according to an embodiment of the present disclosure. In FIG. 11B, the same reference numerals denote the same elements in FIG. 11A, and thus, detailed descriptions of the same elements will be omitted.

Referring to FIG. 11B, a gas controller AC-1 may be disposed to be spaced apart from a heater HP in the first direction DR1. The gas controller AC-1 may include a suction unit VC.

According to an embodiment of the present disclosure, the display module manufacturing apparatus may include a plurality of gas controllers AC-1. Further, the display module manufacturing apparatus may include a plurality of suction units VC connected to respective gas controller AC-1.

According to an embodiment of the present disclosure, a residual layer is formed by a plastic resin accumulated at opposite ends spaced apart from each other in the first direction DR1 of the protective film PF when the protective film PF is melted due to the heat from the heater HP. The suction unit VC may prevent the residual layer from being formed. The suction unit VC may suck and remove a portion PFP of the protective film PF before the residual layer is formed. Since a viscosity of the portion PFP of the protective film PF increases due to a temperature of the portion PFP raised by the heater HP, the portion PFP may be easily removed by the suction unit VC. The suction unit VC may prevent the residual layer from protruding in the first direction DRL.

According to some embodiments of the present disclosure, the display module manufacturing apparatus may prevent the residual layer from being formed. The display module manufacturing apparatus may prevent defects from occurring when the display device DD (refer to FIG. 4) is bent in the state in which the residual layer is protruded and at least a portion of the residual layer is separated from the protective film PF. Accordingly, the display module manufacturing apparatus may manufacture the display module DM with improved reliability.

In FIG. 11B, the gas controller AC-1 may be disposed on the portion PFP of the protective film PF and may suck the portion PFP. However, the gas controller AC-1 is not limited thereto or thereby. According to an embodiment of the present disclosure, the gas controller AC-1 may be disposed under the portion PFP of the protective film PF and may suck the portion PFP.

While the present invention has been described with reference to embodiments thereof, it is understood that various changes and modifications can be made thereto by one of ordinary skill in the art without departing from the spirit and scope of the present invention as set forth in the attached claims.

What is claimed is:

1. A display module manufacturing apparatus comprising:
a stage on which a display module is disposed;
a heater disposed on the stage, and configured to heat a first area of the display module to generate a first bump disposed on the display module, wherein the heater comprises a plurality of side surfaces and a contact surface; and
a first bump controller detachably coupled to one side surface among the plurality of side surfaces and comprising a first bottom surface facing an upper surface of the stage, wherein the contact surface is closer to the upper surface of the stage than the first bottom surface,
wherein the first bump controller is configured to receive a heat from the heater and apply the heat to reduce a thickness of the first bump,
wherein the contact surface protrudes from the first bottom surface in a third direction by a predetermined thickness, and
wherein the contact surface is excluded from overlapping with the first bottom surface.

2. The display module manufacturing apparatus of claim 1, wherein the first bottom surface is flat.

3. The display module manufacturing apparatus of claim 1, wherein the first bottom surface comprises a curved surface.

4. The display module manufacturing apparatus of claim 1, wherein at least a portion of the first bump controller makes contact with the one side surface.

5. The display module manufacturing apparatus of claim 1, wherein the heater and the first bump controller have different thermal conductivities from each other.

6. The display module manufacturing apparatus of claim 1, wherein the heater extends in a first direction, the plurality of side surfaces comprise first side surfaces opposed to each other in the first direction and second side surfaces opposed to each other in a second direction crossing the first direction, and the one side surface coupled to the first bump controller is one second side surface of the second side surfaces.

7. The display module manufacturing apparatus of claim 6, further comprising a second bump controller detachably coupled to another second side surface of the second side surfaces.

8. The display module manufacturing apparatus of claim 7, wherein the second bump controller comprises a second bottom surface facing the stage, and a first distance between the upper surface of the stage and the first bottom surface is different from a second distance between the upper surface of the stage and the second bottom surface.

9. The display module manufacturing apparatus of claim 6, further comprising a gas controller spaced apart from the upper surface of the stage in the third direction crossing the first direction and the second direction, wherein a distance between the upper surface of the stage and the contact surface of the heater is smaller than or equal to a distance between the upper surface of the stage and the gas controller.

10. The display module manufacturing apparatus of claim 9, wherein the gas controller comprises a spray unit that forms an air curtain.

11. The display module manufacturing apparatus of claim 9, wherein the gas controller comprises a suction unit.

12. The display module manufacturing apparatus of claim 9, wherein the gas controller is spaced apart from the heater in the first direction.

13. The display module manufacturing apparatus of claim 9, wherein the gas controller is provided with an opening passing therethrough, and the opening has a circular shape.

14. The display module manufacturing apparatus of claim 9, wherein the gas controller is inclined with respect to one of the first side surfaces.

15. The display module manufacturing apparatus of claim 9, wherein a first portion of the gas controller is disposed in the heater, and a second portion of the gas controller protrudes from the heater in the third direction.

* * * * *